United States Patent
Kida et al.

(10) Patent No.: US 12,423,955 B2
(45) Date of Patent: Sep. 23, 2025

(54) MACHINE LEARNING DEVICE AND FAR-INFRARED IMAGE CAPTURING DEVICE

(71) Applicant: JVCKENWOOD Corporation, Yokohama (JP)

(72) Inventors: Shingo Kida, Yokohama (JP); Hideki Takehara, Yokohama (JP); Yincheng Yang, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 406 days.

(21) Appl. No.: 18/173,820

(22) Filed: Feb. 24, 2023

(65) Prior Publication Data

US 2023/0196739 A1   Jun. 22, 2023

Related U.S. Application Data

(63) Continuation of application No. PCT/JP2021/003567, filed on Feb. 1, 2021.

(30) Foreign Application Priority Data

Aug. 26, 2020   (JP) .................................. 2020-142706

(51) Int. Cl.
  *G06V 10/774*   (2022.01)
  *G06V 10/20*   (2022.01)
  *H04N 23/20*   (2023.01)

(52) U.S. Cl.
  CPC ............ *G06V 10/774* (2022.01); *G06V 10/20* (2022.01); *H04N 23/20* (2023.01)

(58) Field of Classification Search
  None
  See application file for complete search history.

(56) References Cited

U.S. PATENT DOCUMENTS

| | | | | |
|---|---|---|---|---|
| 2018/0341832 | A1* | 11/2018 | Uhlenbrock | G06V 10/454 |
| 2021/0400167 | A1* | 12/2021 | Heitz, III | G06T 5/77 |
| 2022/0222817 | A1* | 7/2022 | AlRegib | G06V 10/82 |

FOREIGN PATENT DOCUMENTS

| | | |
|---|---|---|
| JP | 2019-046276 A | 3/2019 |
| JP | 2019-204147 A | 11/2019 |
| JP | 6663524 B1 | 3/2020 |
| JP | 6742554 B1 | 8/2020 |
| WO | 2019176235 A1 | 9/2019 |
| WO | 20200158217 A1 | 8/2020 |

OTHER PUBLICATIONS

International Search Report from International Application No. PCT/JP2021/003567 mailed Apr. 20, 2021, 6 pages.
International Preliminary Report on Patentability from International Application No. PCT/JP2021/003567 mailed Feb. 28, 2023, 10 pages.

* cited by examiner

*Primary Examiner* — Leon Flores
(74) *Attorney, Agent, or Firm* — Shih IP Law Group, PLLC

(57) ABSTRACT

A far-infrared image acquisition unit acquires a far-infrared image. An image conversion unit converts the acquired far-infrared image into a visible light image. A visible light image trained model storage unit stores a first visible light image trained model having performed learning using the visible light image as training data. A transfer learning unit performs transfer learning on a first visible light image trained model by using the visible light image obtained by conversion as training data to generate a second visible light image trained model.

5 Claims, 6 Drawing Sheets

MACHINE LEARNING DEVICE AND FAR-INFRARED IMAGE CAPTURING DEVICE

BACKGROUND OF THE INVENTION

1. Field of the Invention

The present invention relates to a transfer learning technique.

2. Description of the Related Art

At night when there is no visible light, an infrared camera is used instead of a visible light camera to capture an image of an object, and a specific object such as a person is detected from a far-infrared image. However, a trained model for general-purpose object detection suitable for far-infrared images is difficult to obtain. Therefore, transfer learning in which learning of the trained model for general-purpose object detection using an RGB image is performed again by using an infrared image as training data is performed.

Patent Literature 1 discloses a learning device that performs transfer learning on a learned RGB video model having performed learning by using an RGB video and utterance contents corresponding thereto as training data, by using an infrared image and utterance contents corresponding thereto as training data, and generates an infrared video model.

PRIOR ART LITERATURE

Patent Literature

[Patent Literature 1] JP 2019-204147 A

When transfer learning using a far-infrared image as training data is performed on an object detection model using an RGB image, color information is lost at the time of the transfer learning, and thus there is a problem that a recognition rate of inference of the object detection model after the transfer learning is lowered.

SUMMARY OF THE INVENTION

The present invention has been made in view of such a situation, and an object thereof is to provide a transfer learning technique with high inference accuracy.

In order to solve the above problem, a machine learning device according to an embodiment of the present invention includes a far-infrared image acquisition unit that acquires a far-infrared image; an image conversion unit that converts the acquired far-infrared image into a visible light image; a visible light image trained model storage unit that stores a first visible light image trained model having performed learning using a visible light image as training data; and a transfer learning unit that performs transfer learning on the first visible light image trained model by using the visible light image obtained by the conversion as training data to generate a second visible light image trained model.

Another embodiment of the present invention is a far-infrared image capturing device. This device includes a far-infrared image acquisition unit that acquires a far-infrared image; an image conversion unit that converts the acquired far-infrared image into a visible light image; and an object detection unit that detects an object from the visible light image obtained by the conversion, by using a second visible light image trained model generated by performing transfer learning on a first visible light image trained model by using an image obtained by converting a far-infrared image into a visible light image as training data.

Optional combinations of the aforementioned constituting elements and implementations of the invention in the form of methods, apparatuses, systems, recording mediums, and computer programs may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
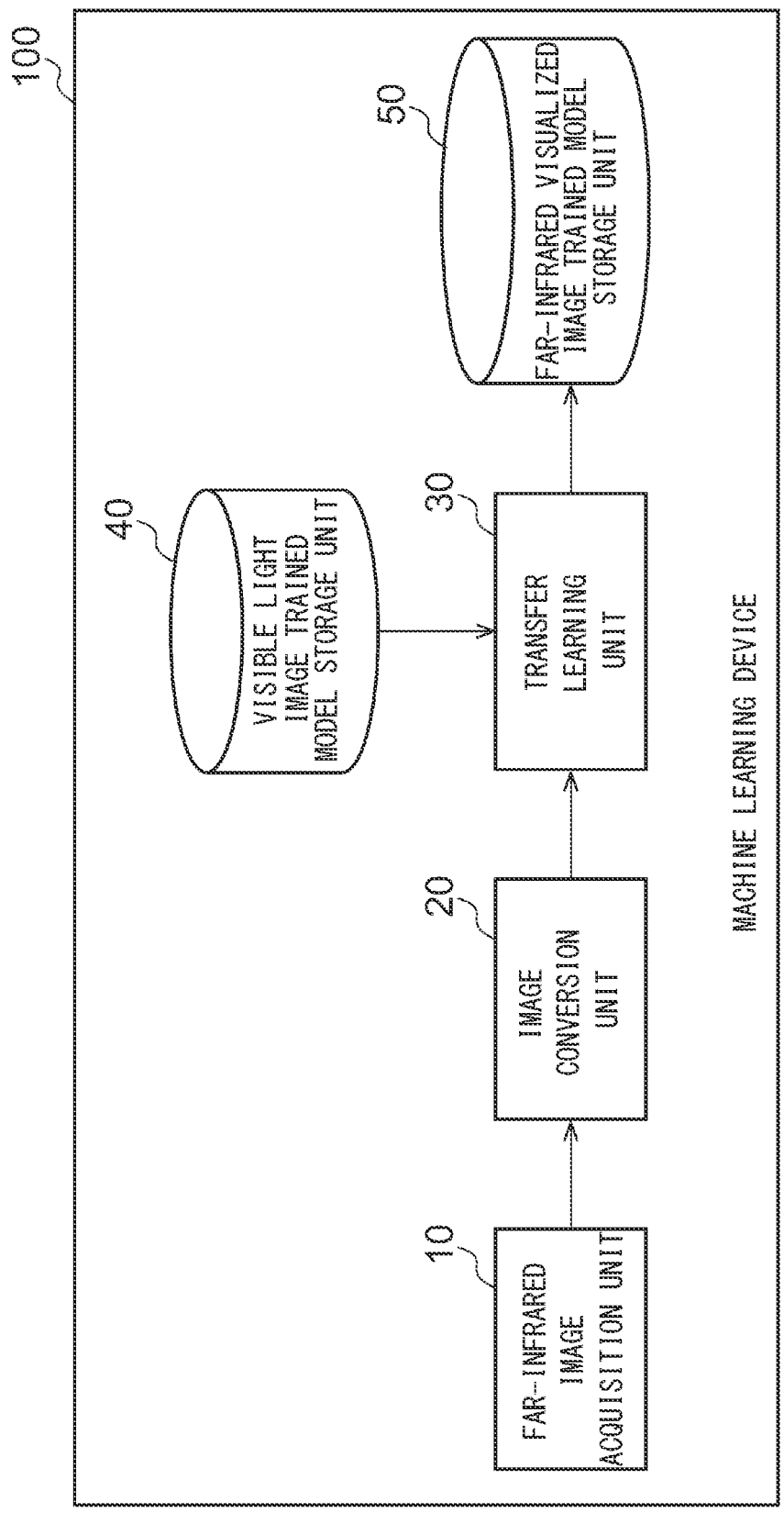
FIG. 1 is a configuration diagram of a machine learning device according to an embodiment.

FIG. 1 is a configuration diagram of a machine learning device 100 according to an embodiment. The machine learning device 100 includes a far-infrared image acquisition unit 10, an image conversion unit 20, a transfer learning unit 30, a visible light image trained model storage unit 40, and a far-infrared visualized image trained model storage unit 50.

The far-infrared image acquisition unit 10 acquires a far-infrared image captured by the far-infrared image capturing device, and supplies the far-infrared image to the image conversion unit 20.

The image conversion unit 20 converts the far-infrared image into a visible light image on the basis of an image conversion model machine-learned by using far-infrared images and visible light images as training data.

The image conversion unit 20 includes a generation unit that performs machine learning by using far-infrared images and visible light images as training data and generates a generation model for generating a visible light image from a far-infrared image, and inputs the acquired far-infrared image to the generation model to convert the far-infrared image into a visible light image.

As an example of machine learning, generative adversarial networks (GAN) are used. In the generative adversarial networks, two neural networks, a generator and a discriminator, perform adversarial learning. Methods for learning image-to-image translation using the generative adversarial networks include a method called CycleGAN and a method called Pix2Pix. In Pix2Pix, the image before conversion and the image after the conversion that are provided as a training dataset need to be paired in a one-to-one correspondence. However, in CycleGAN, learning can be done using a combination of images that are not an exact pair as a training dataset.

The visible light image trained model storage unit 40 stores a first visible light image trained model for object detection having performed learning using the visible light image as training data.

The transfer learning unit 30 performs transfer learning on the first visible light image trained model by using the visible light image obtained by conversion by the image conversion unit 20 as training data to generate a second visible light image trained model.

In the transfer learning, a new layer is added to the neural network of the first visible light image trained model, and the visible light image converted from the far-infrared image is learned as training data, thereby generating the neural network of the second visible light image trained model.

The far-infrared visualized image trained model storage unit 50 stores the second visible light image trained model after the transfer learning.

Since the image obtained by converting the far-infrared image into the visible light image is used as training data, the first visible light image trained model can be transferred to the second visible light image trained model without loss of color information.

Since the first visible light image trained model is an object detection model having learned using the visible light image as training data, relearning using the visible light image converted from the far-infrared image as training data has higher affinity with the trained model and thus the second visible light image trained model after transfer learning has higher accuracy of object detection, than the case of relearning using the far-infrared image as training data.

Figure 2:
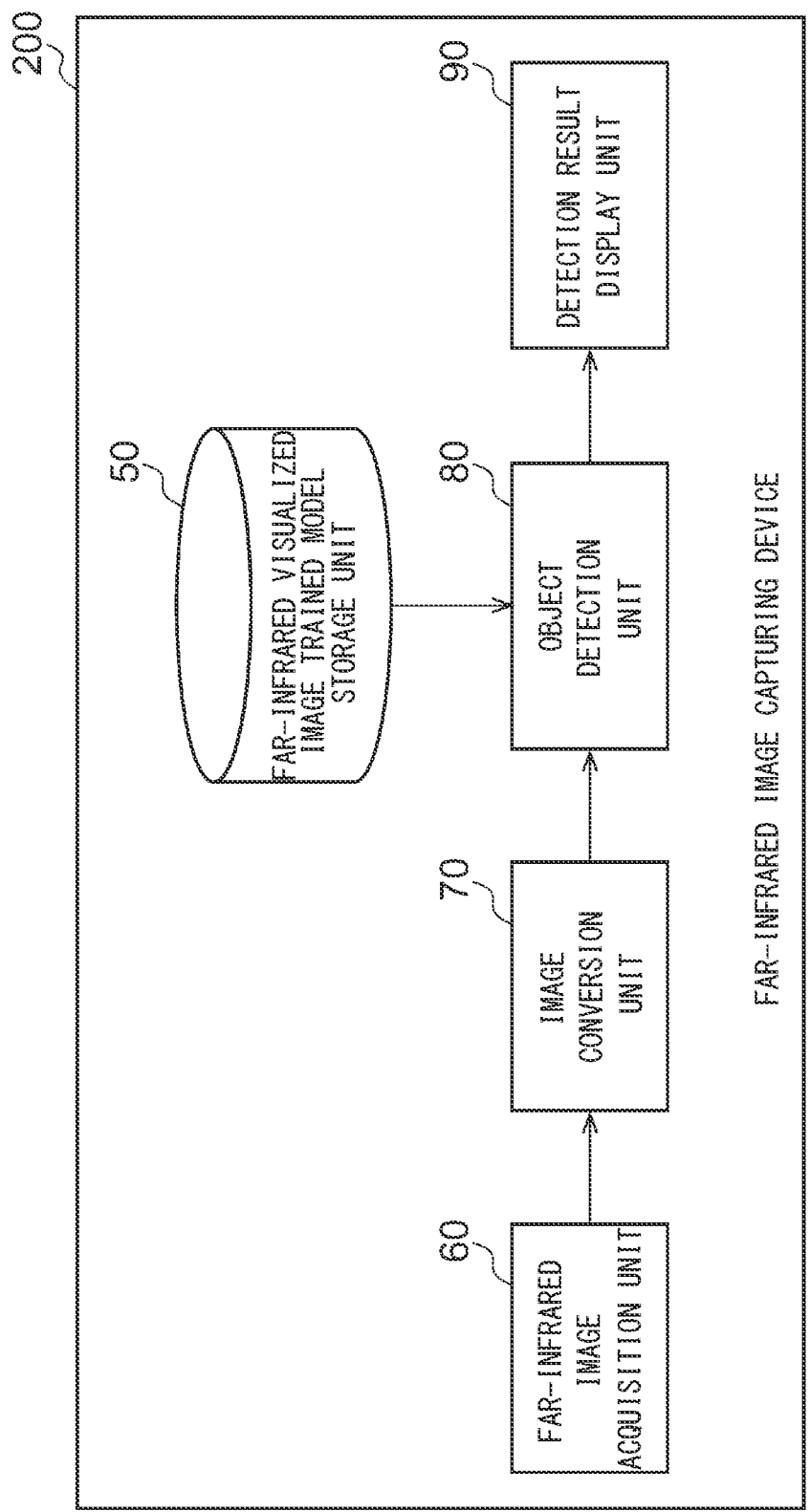
FIG. 2 is a configuration diagram of a far-infrared image capturing device according to an embodiment.

FIG. 2 is a configuration diagram of a far-infrared image capturing device 200 according to the embodiment. The far-infrared image capturing device 200 includes a far-infrared visualized image trained model storage unit 50, a far-infrared image acquisition unit 60, an image conversion unit 70, an object detection unit 80, and a detection result display unit 90. The far-infrared visualized image trained model storage unit 50 has the same configuration as the configuration of the far-infrared visualized image trained model storage unit 50 in FIG. 1, and stores the second visible light image trained model generated by the transfer learning unit 30.

The far-infrared image acquisition unit 60 acquires a far-infrared image captured by the far-infrared image capturing device, and supplies the far-infrared image to the image conversion unit 70.

The image conversion unit 70 converts the far-infrared image into a visible light image on the basis of an image conversion model machine-learned by using far-infrared images and visible light images as training data. The image conversion unit 70 has the same configuration as the image conversion unit 20 in FIG. 1.

The object detection unit 80 detects an object from the converted visible light image by using the second visible light image trained model stored in the far-infrared visualized image trained model storage unit 50.

Here, the second visible light image trained model is an object detection model generated by performing transfer learning on the first visible light image trained model by using an image obtained by converting a far-infrared image into a visible light image as training data. By using the second visible light image trained model after transfer learning, the recognition accuracy at the time of detecting an object from the visible light image obtained by converting the far-infrared image is improved.

The detection result display unit 90 displays the detection result by circling a detected object with a frame or the like in the visible light image obtained by conversion or the far-infrared image that is not converted.

Figure 3:
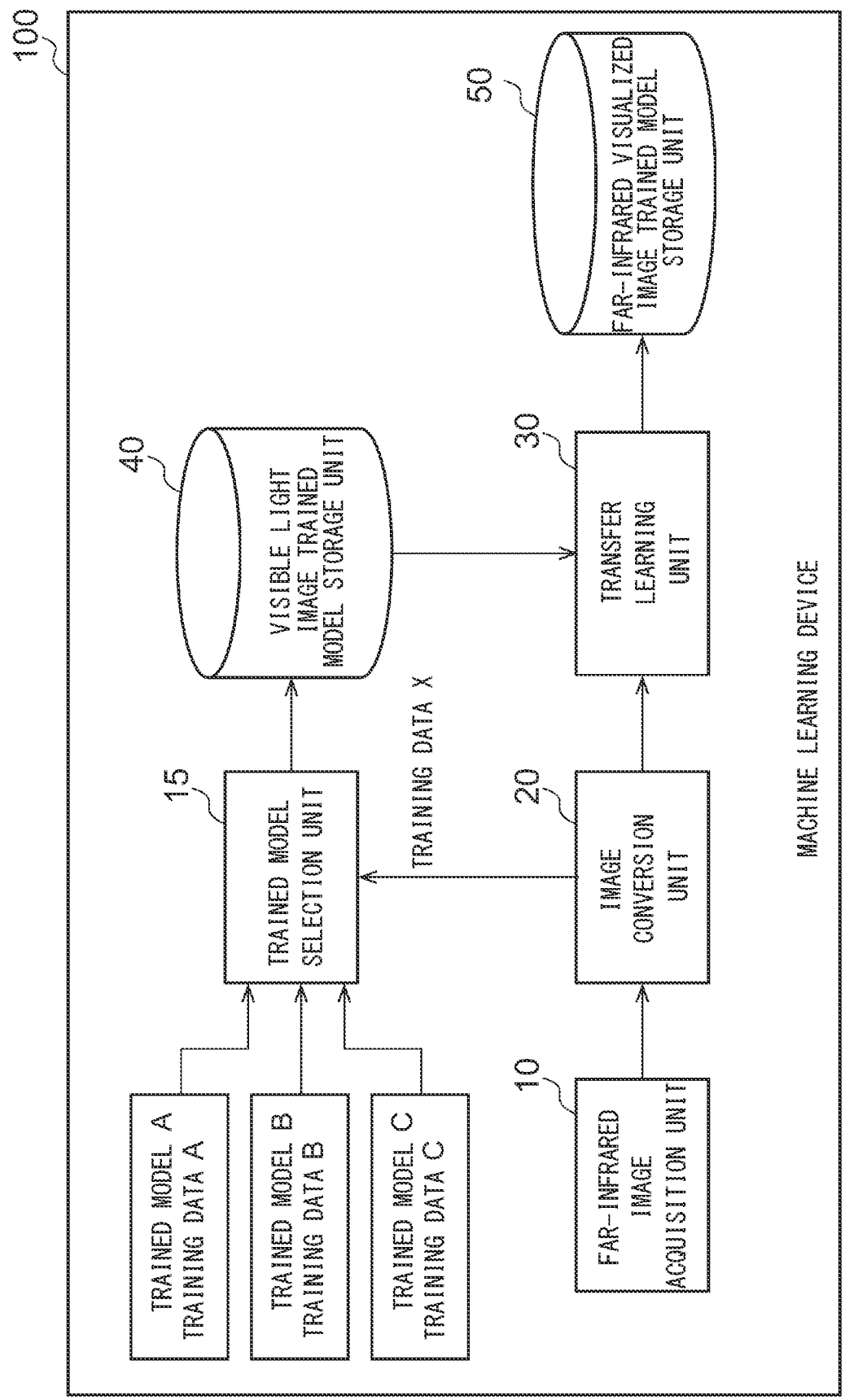
FIG. 3 is a configuration diagram of a machine learning device according to another embodiment.

FIG. 3 is a configuration diagram of the machine learning device 100 according to another embodiment. The machine learning device 100 of FIG. 3 is different from the machine learning device 100 of FIG. 1 in that a trained model selection unit 15 is included. Here, elements different from those of the machine learning device 100 of FIG. 1 will be described, and description of the same elements as in the machine learning device 100 of FIG. 1 will be omitted as appropriate.

The trained model selection unit 15 selects a first visible light image trained model most suitable for detecting an object from the visible light image obtained by conversion by the image conversion unit 20 among a plurality of first visible light image trained models, and stores the selected first visible light image trained model in the visible light image trained model storage unit 40.

A method for selecting the optimal first visible light image trained model will be described more specifically. There are three trained models A, B, and C as a plurality of first visible light image trained models, and visible light images used as training data of the trained models A, B, and C are set as training data A, B, and C. The visible light image obtained by conversion by the image conversion unit 20 is set as training data X. Similarity of the training data A, B, and C with respect to the training data X is calculated, and a trained model having the highest similarity among the trained models A, B, and C is selected as an optimal first visible light image trained model.

Similarity of training data is calculated from a difference between feature values A', B', and C' of an intermediate layer in a subsequent stage of the neural network, which are intermediate outputs when the training data A, B, and C are input to the trained models A, B, and C, and feature values $X_A'$, $X_B'$, and $X_C'$ of the intermediate layer in a subsequent stage of the neural network, which are intermediate outputs when the training data X is input to the trained models A, B, and C. The smaller the difference is, the higher the similarity is. A trained model having a minimum difference among the trained models A, B, and C is selected as an optimal first visible light image trained model.

The transfer learning unit 30 reads the optimal first visible light image trained model from the visible light image trained model storage unit 40, and uses the visible light image obtained by conversion by the image conversion unit 20 as training data to perform transfer learning on the optimal first visible light image trained model, thereby generating a second visible light image trained model.

Since the transfer learning utilizes parameters such as weights and coefficients of the trained model as they are, it is possible to improve the inference accuracy by selecting a trained model having high similarity of training data and performing transfer learning.

Figure 4:
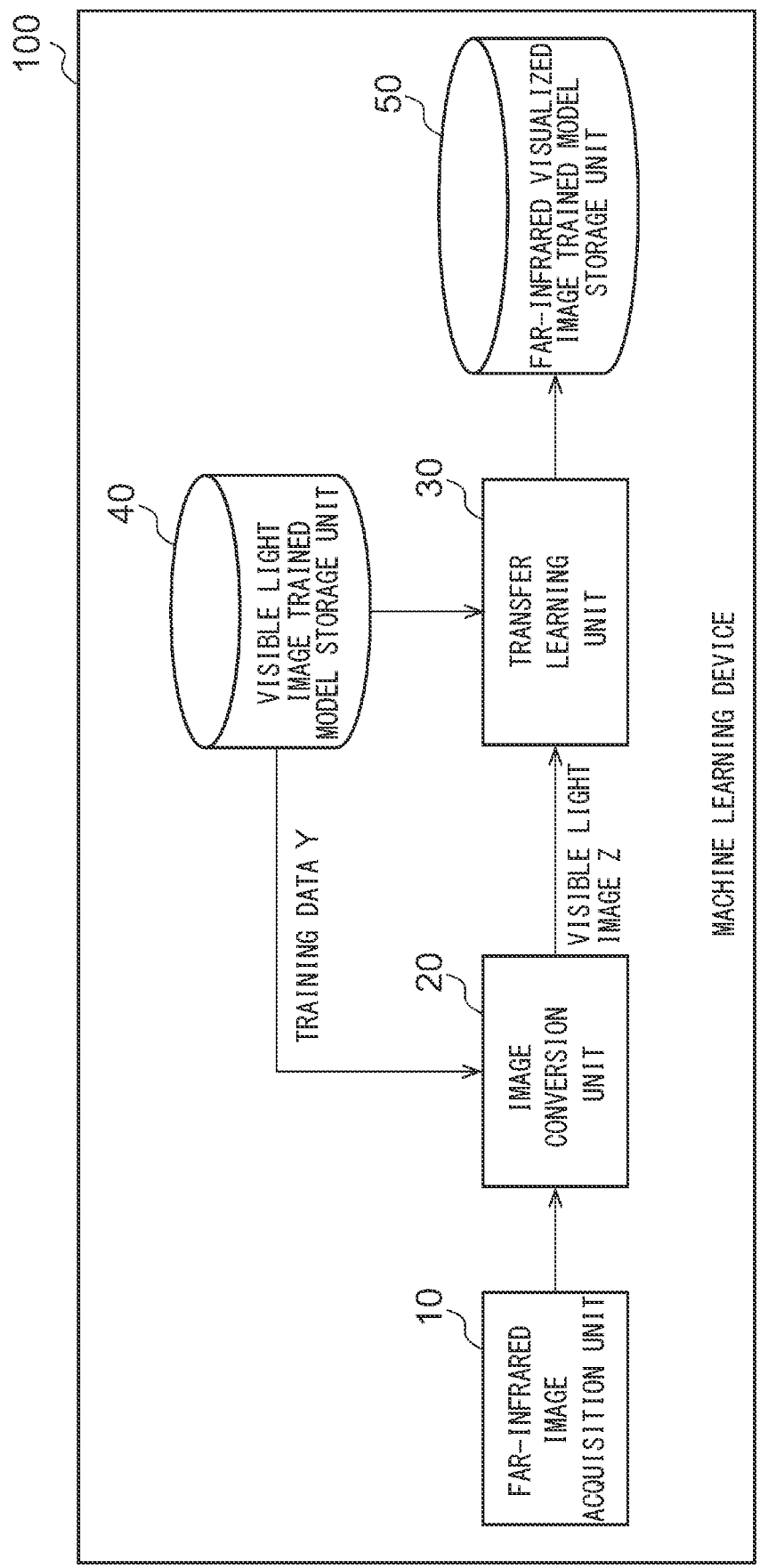
FIG. 4 is a configuration diagram of a machine learning device according to a yet another embodiment.

FIG. 4 is a configuration diagram of a machine learning device 100 according to a yet another embodiment. The configuration and operation of the image conversion unit 20 in FIG. 4 are different from those of the image conversion unit 20 of the machine learning device 100 in FIG. 1, and the other elements thereof are the same as those of the machine learning device 100 in FIG. 1, and thus redundant description will be appropriately omitted.

The generation unit of the image conversion unit 20 generates a generation model by machine learning by using the far-infrared image acquired by the far-infrared image acquisition unit 10 and the visible light image used as training data of the first visible light image trained model stored in the visible light image trained model storage unit 40 as training data. The image conversion unit 20 converts the far-infrared image into a visible light image by using a generation model generated by using the visible light image used in the first visible light image trained model as training data.

The far-infrared image acquired by the far-infrared image acquisition unit 10 and the visible light image used as the training data of the first visible light image trained model are not a pair corresponding on a one-to-one basis. Therefore, in a case where generative adversarial networks are used as machine learning, it is necessary to use CycleGAN capable of learning use of a combination of images that is not a strict pair as a training dataset.

By using the visible light image used as training data of the first visible light image trained model for object detection for machine learning of the generation model by the image conversion unit 20, the visible light image converted from the far-infrared image by the image conversion unit 20 becomes suitable for the object detection model.

The generation unit of the image conversion unit 20 performs machine learning by using the far-infrared image and the visible light image as training data in the generative adversarial networks, and generates a generation model for generating a visible light image from a far-infrared image. As the visible light image, the visible light image used as training data of the first visible light image trained model used in the transfer learning by the transfer learning unit 30 is used as training data Y. As a result, a visible light image Z converted from the far-infrared image by the image conversion unit 20 reflects characteristics of the training data Y, and the visible light image Z becomes effective training data Z as an input to the transfer learning unit 30 in a subsequent stage.

In the transfer learning, since parameters such as weights and coefficients of the trained model are used as they are, if the correlation between the training data Y and the training data Z is high, accuracy of a transfer-trained model can be improved, and thus inference accuracy can be improved.

Figure 5:
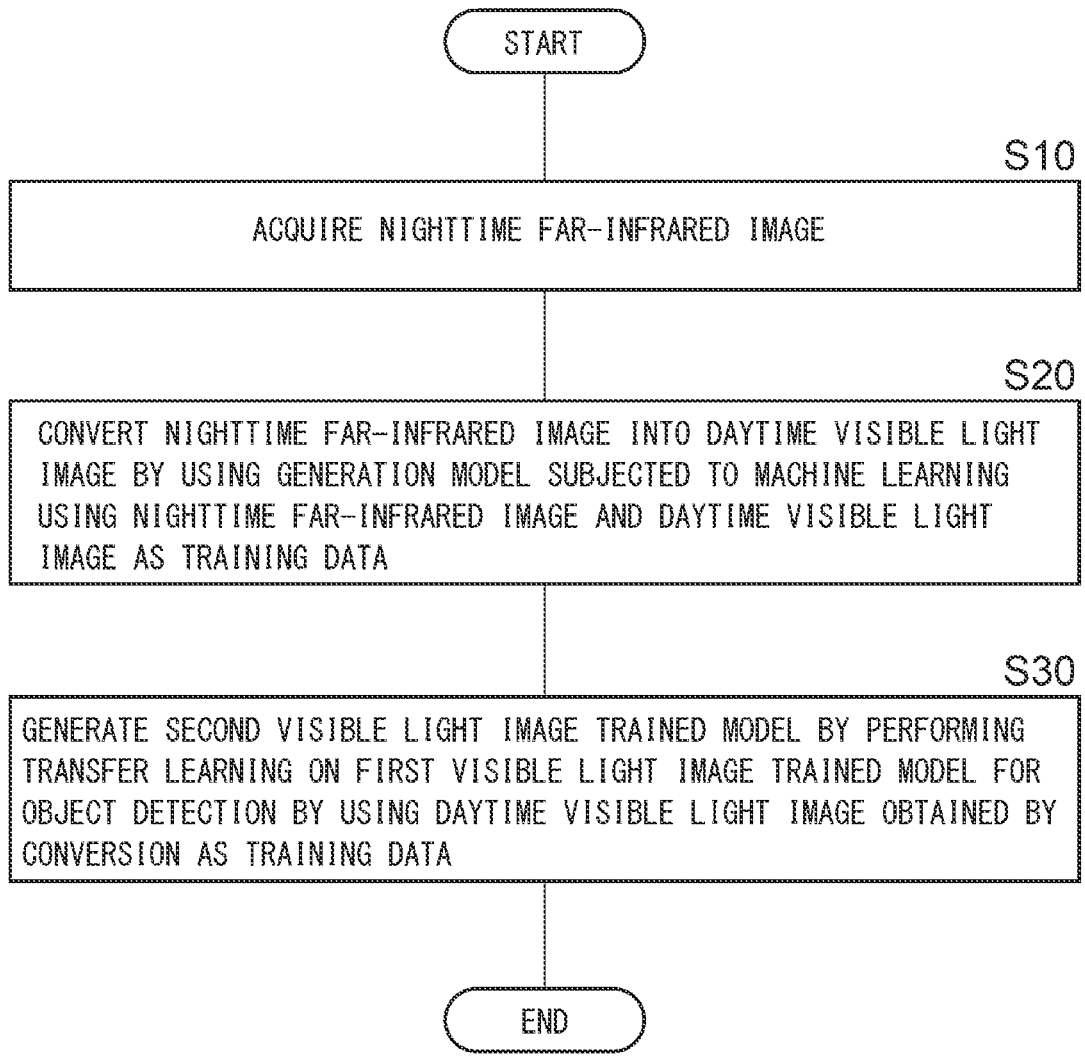
FIG. 5 is a flowchart for describing a transfer learning procedure by the machine learning device of FIG. 1.

FIG. 5 is a flowchart for describing a procedure for causing the machine learning device 100 to perform transfer learning of the first visible light image trained model to generate the second visible light image trained model.

A nighttime infrared image captured by a far-infrared camera is acquired (S10).

The acquired nighttime far-infrared image is converted into a daytime visible light image by using the generation model having performed machine learning by using nighttime far-infrared images and daytime visible light images as training data (S20).

Transfer learning is performed on the first visible light image trained model for object detection by using the daytime visible light image obtained by conversion as training data to generate a second visible light image trained model (S30).

Figure 6:
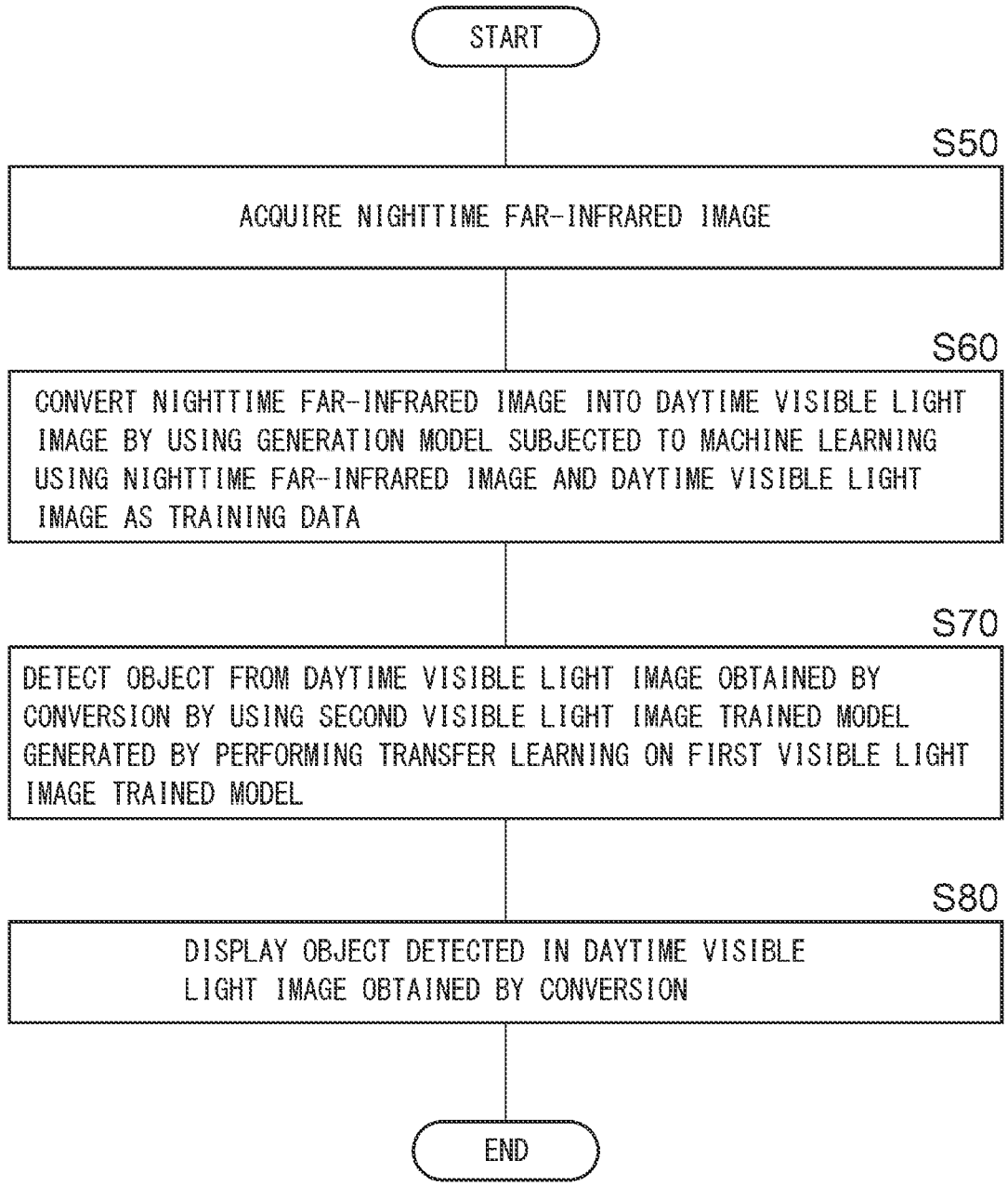
FIG. 6 is a flowchart illustrating an object detection procedure by the far-infrared image capturing device of FIG. 2.

FIG. 6 is a flowchart for describing a procedure for detecting an object from the visible light image by the far-infrared image capturing device 200 by using the second visible light image trained model generated by performing transfer learning on the first visible light image trained model.

The nighttime far-infrared image captured by the far-infrared image capturing device 200 is acquired (S50).

The acquired nighttime far-infrared image is converted into a daytime visible light image by using the generation model having performed machine learning by using nighttime far-infrared images and daytime visible light images as training data (S60).

An object is detected from the daytime visible light image obtained by conversion by using the second visible light image trained model generated by transfer learning on the first visible light image trained model (S70).

In the daytime visible light image obtained by conversion, the detected object is highlighted by being circled by a frame or the like (S80). In the nighttime far-infrared image before conversion, the detected object may be circled by a frame to be highlighted.

The various processes of the machine learning device 100 and the far-infrared image capturing device 200 described above can be realized as a device using hardware such as a CPU and memory as a matter of course, and can be realized by firmware stored in a read-only memory (ROM), a flash memory, etc., or by software on a computer, etc. The firmware program or the software program may be made available on, for example, a computer readable recording medium. Alternatively, the programs may be transmitted to and/or received from a server via a wired or wireless network. Still alternatively, the programs may be transmitted and/or received in the form of data transmission over terrestrial or satellite digital broadcast systems.

As described above, since the general-purpose learned object detection model has performed learning by using a visible light image as training data, when relearning is performed by using a black-and-white image such as a far-infrared image as the training data at the time of transfer learning, parameters reflecting the color information is not well adapted in the trained model due to the lack of the color information, and the inference accuracy is lowered. In contrast, according to the embodiments of the present invention, since a far-infrared image is converted into a visible light image and then the learned general-purpose object detection model is subjected to transfer learning by using the visible light image as training data, parameters reflecting the color information is not impaired in the trained model, and is subjected to relearning by using the visible light image obtained by conversion, so that the inference accuracy is improved.

The object detection model has higher detection accuracy in the case of a visible light image than in the case of a far-infrared image. In addition, when a general-purpose learned object detection model is used, although a learned object detection model for a visible light image is disclosed to the public and easily available, a trained model for a far-infrared image is difficult to obtain. According to the embodiments of the present invention, since the general-purpose learned object detection model for a visible light image is subjected to transfer learning by using the visible light image converted from the far-infrared image as training data, a person or an object can be detected with higher accuracy using color information of the image in the visible light image converted from the far-infrared image.

Described above is an explanation of the present invention based on the embodiments. The embodiments are intended to be illustrative only, and it will be obvious to those skilled in the art that various modifications to constituting elements and processes could be developed and that such modifications are also within the scope of the present invention.

What is claimed is:
1. A machine learning device comprising:
   a far-infrared image acquisition unit that acquires a far-infrared image;

an image conversion unit that converts the acquired far-infrared image into a visible light image;

a visible light image trained model storage unit that stores a first visible light image trained model having performed learning using a visible light image as training data; and a transfer learning unit that performs transfer learning on the first visible light image trained model by using the visible light image obtained by the conversion as training data to generate a second visible light image trained model.

2. The machine learning device according to claim 1, further comprising a trained model selection unit that selects, from among a plurality of first visible light image trained models, a first visible light image trained model for which a difference between an intermediate output of a case where the visible light image obtained by the conversion is input to each of the first visible light image trained models and an intermediate output of a case where a visible light image used as training data of each of the first visible light image trained models is input to each of the first visible light image trained models is the smallest, and store the selected first visible light image trained model in the visible light image trained model storage unit.

3. The machine learning device according to claim 1, wherein the image conversion unit includes a generation unit that performs machine learning by using a far-infrared image and a visible light image as training data and generate a generation model for generating a visible light image from a far-infrared image, and the acquired far-infrared image is input to the generation model to be converted into a visible light image.

4. The machine learning device according to claim 3, wherein the generation unit performs machine learning in generative adversarial networks by using a far-infrared image and a visible light image used as training data of the first visible light image trained model as training data, and generates the generation model that generates a visible light image from a far-infrared image.

5. A far-infrared image capturing device comprising:

a far-infrared image acquisition unit that acquires a far-infrared image;

an image conversion unit that converts the acquired far-infrared image into a visible light image; and an object detection unit that detects an object from the visible light image obtained by the conversion, by using a second visible light image trained model generated by performing transfer learning on a first visible light image trained model by using an image obtained by converting a far-infrared image into a visible light image as training data.

* * * * *